(12) United States Patent
Uehara et al.

(10) Patent No.: US 6,976,680 B2
(45) Date of Patent: Dec. 20, 2005

(54) SHAFT SEAL STRUCTURE AND TURBINE

(75) Inventors: Hidekazu Uehara, Takasago (JP);
Tanehiro Shinohara, Takasago (JP);
Kouichi Akagi, Takasago (JP);
Masanori Yuri, Takasago (JP); Takashi
Nakano, Takasago (JP); Shin
Nishimoto, Takasago (JP)

(73) Assignee: Mitsubishi Heavy Industries, Ltd.,
Tokyo (JP)

( * ) Notice: Subject to any disclaimer, the term of this patent is extended or adjusted under 35 U.S.C. 154(b) by 133 days.

(21) Appl. No.: 10/253,511

(22) Filed: Sep. 25, 2002

(65) Prior Publication Data

US 2003/0062686 A1 Apr. 3, 2003

(30) Foreign Application Priority Data

Sep. 28, 2001 (JP) ....................... 2001-298748

(51) Int. Cl.⁷ ............................... F16J 15/447
(52) U.S. Cl. ..................... 277/355; 277/413; 277/416
(58) Field of Search ..................... 277/355, 409–422

(56) References Cited

U.S. PATENT DOCUMENTS

| | | | | |
|---|---|---|---|---|
| 1,855,890 A | * | 4/1932 | Phillips | 277/416 |
| 2,600,991 A | * | 6/1952 | Hargrove | 277/416 |
| 3,594,010 A | * | 7/1971 | Warth | 277/413 |
| 5,135,237 A | * | 8/1992 | Flower | 277/355 |
| 5,395,124 A | * | 3/1995 | Brandon | 277/413 |
| 5,603,510 A | * | 2/1997 | Sanders | 277/413 |
| 6,027,121 A | * | 2/2000 | Cromer et al. | 277/347 |
| 6,250,641 B1 | * | 6/2001 | Dinc et al. | 277/355 |
| 6,267,381 B1 | * | 7/2001 | Wright | 277/355 |
| 6,331,006 B1 | * | 12/2001 | Baily et al. | 277/355 |
| 6,527,115 B2 | * | 3/2003 | Rabiner et al. | 206/363 |

FOREIGN PATENT DOCUMENTS

| | | | |
|---|---|---|---|
| EP | 1 013 975 | 6/2000 | |
| JP | 51-111507 | 10/1976 | |
| JP | 61152906 A | * 7/1986 | ........... F01D/11/08 |
| JP | H02-211303 | 8/1990 | |
| JP | 9-25804 | 1/1997 | |
| JP | 2000-120879 | 4/2000 | |

* cited by examiner

Primary Examiner—Alison Pickard
Assistant Examiner—Vishal Patel
(74) Attorney, Agent, or Firm—Oblon, Spivak, McClelland, Maier & Neustadt, P.C.

(57) ABSTRACT

The shaft seal structure is based on a leaf seal that includes springs, disposed between the stator blades and the leaf seal ring, to force the leaf seal ring away from the rotation shaft, and pressure guiding grooves for guiding the fluid pressure, through a boundary of planar plates, to a space between the outer peripheral surface of the leaf seal ring and the inner peripheral surface of the stator blade. Also, a turbine may be provided with the leaf seal so as to reduce gas leakage from the high-pressure-region to the low-pressure-region as well as to control the frictional wear between the planar plates and the rotation shaft.

5 Claims, 12 Drawing Sheets

23; ROTATION AXIS
24a; STATOR BLADE
33; SPRING (PUSHING MEMBER)

23; ROTATION AXIS
24a; STATOR BLADE
33; SPRING (PUSHING MEMBER)
34; PRESSURE GUIDING GROOVE

23; ROTATION AXIS  34; PRESSURE GUIDING GROOVE
24a; STATOR BLADE

23; ROTATION AXIS  33; SPRING (PUSHING MEMBER)
24a; STATOR BLADE

23; ROTATION AXIS
24a; STATOR BLADE
33; SPRING (PUSHING MEMBER)
34; PRESSURE GUIDING GROOVE

HIGH PRESSURE REGION — LOW PRESSURE REGION

23; ROTATION AXIS
24a; STATOR BLADE
36; LEAF SPRING (PUSHING MEMBER)

23; ROTATION AXIS
24a; STATOR BLADE
36; LEAF SPRING (PUSHING MEMBER)

23; ROTATION AXIS
24a; STATOR BLADE
38; HOLDING MEMBER

23; ROTATION AXIS
24a; STATOR BLADE
33; SPRING (PUSHING MEMBER)
34; PRESSURE GUIDING GROOVE
38; HOLDING MEMBER

HIGH PRESSURE REGION            LOW PRESSURE REGION

23; ROTATION AXIS            33; SPRING (PUSHING MEMBER)
24a; STATOR BLADE

23; ROTATION AXIS            33; SPRING (PUSHING MEMBER)
24a; STATOR BLADE

23; ROTATION AXIS  
24a; STATOR BLADE  
36; LEAF SPRING (PUSHING MEMBER)

23; ROTATION AXIS  
24a; STATOR BLADE  
36; LEAF SPRING (PUSHING MEMBER)

23; ROTATION AXIS
24a; STATOR BLADE
33; SPRING (PUSHING MEMBER)

23; ROTATION AXIS
24a; STATOR BLADE
33; SPRING (PUSHING MEMBER)

ROTATION DIRECTION

SHAFT SEAL STRUCTURE AND TURBINE

BACKGROUND OF THE INVENTION

1. Field of the Invention

The present invention relates to a shaft seal structure suitable for application to rotation shafts and the like used in large fluidic machines such as gas turbines, steam turbines, compressors and pumps, and relates also to a turbine that converts fluid thermal energy into rotational energy for generating a motion power, and relates in particular to a shaft seal structure that can be applied to a rotation shaft of the turbine.

2. Description of the Related Art

In general, for gas turbines and steam turbines, a shaft seal structure is provided around the rotation shaft for reducing leakage of combustion gas from the high-pressure-region to the low-pressure-region. An example of such a shaft seal is a leaf seal 1 shown in FIG. 18.

The leaf seal 1 comprises a plurality of layers of planar plates 3, having a predetermined width dimension in the axial direction of the rotation shaft 2, arranged in the circumferential direction of the rotation shaft 2.

The base section of the planar plates 3 of the outer periphery is fixed to a leaf seal ring 5 by means of a brazed section 4, and the tip end of the planar plates 3 is on the inner periphery, and is made to contact the rotation shaft 2 at a given pre-loading value. The tip of each planar plate 3, as shown in FIGS. 18 and 19, slidably contacts the peripheral surface of the rotation shaft 2 at an acute angle with the peripheral surface of the rotation shaft with respect to the rotation direction of the rotation shaft 2 (shown by the arrow d in the diagram).

The planar plate 3 attached to the leaf seal ring 5, as described above, serves as a seal on the outer peripheral surface of the rotation shaft 2, and divides the surrounding space of the rotation shaft 2 into a high pressure region and a low pressure region.

The planar plates 3 of the leaf seal ring 5 are surrounded laterally by a high-pressure-region plate 7 in the high-pressure-region and by a low-pressure-region plate 8 in the low-pressure-region to act as guiding plates to operate in the pressurizing direction.

When the rotation shaft 2 having the leaf seal 1, constructed in the manner described above, is rotated, tip end of each planar plate 3 is floated away from the peripheral surface of the rotation shaft 2 due to the kinematic effect generated by the moving rotation shaft 2, thereby preventing the tips of each strip 3 from contacting the rotation shaft 2. By doing this, wear of the components is prevented.

However, when such a leaf seal 1 is operated at low speeds, such as during the startup, the floating force exerted on each strip 3 is weak. As shown in FIG. 20, the shaft rotates while the tips of the strip 3 are in contact with the peripheral surface of the rotation shaft 2; thus, there is a problem in that friction between the strips 3 and the rotation shaft 2 occurs.

Also, during the highspeed operation of the rotation shaft 2, there is a case in that the extent of thermal expansion of the leaf seal ring 5 and the stator section (not shown) to which the leaf seal ring 5 is attached is greater than that of the rotation shaft 2. In other words, there is a case in that the thermal expansion of the diameter of the leaf seal ring 5 is greater than that of the diameter of the rotation shaft 2, a space 9 is created between the tips of the strips 3 and the rotation shaft 2. As shown in FIG. 21, there is a problem in that the gas leakage increase and the performance of the seal may be lowered.

SUMMARY OF THE INVENTION

The present invention is made in consideration of the above-mentioned problems. An object of the present invention is to provide a shaft seal structure which can reduce the volume of gas leaking from the high-pressure-region to the low-pressure-retion and to control the wear between the planar plates and the rotation shaft. Another object of the present invention is to provide a turbine having such a seal structure.

To achieve the object, the present invention provides a shaft seal structure for blocking a fluid flowing in an axial direction through a ring-shaped space formed between a rotation shaft and a stator section, comprising: a leaf seal ring retained inside the stator section; and a plurality of planar plates separated from each other in a peripheral direction of the rotation shaft, in such a way that an outer peripheral end of each planar plate is fixed inside the leaf seal ring and a tip of each planar plate, expanding in width direction in the axial direction, slidably contacts a peripheral surface of the rotation shaft at an acute angle; wherein provided are pushing members disposed between the stator section and the leaf seal ring for pushing the leaf seal ring towards an outer radial direction to separate the leaf seal ring away from the rotation shaft; and pressure guiding grooves for guiding a fluid pressure from a high-pressure-region to a space between an outer peripheral surface of the leaf seal ring and an inner peripheral surface of the stator section through a boundary formed by the planar plates.

Therefore, when the differential sealing pressure is low in which the planar plates cannot be exposed to sufficient floating force during the slowspeed operation, the leaf seal ring is forced towards outer radial side of the leaf seal ring, the tips of the planar plates provided on the leaf seal ring and the peripheral surface of the rotation shaft are kept in the non-contact state; thus, it is possible to prevent the wear between the planar plates and the rotation shaft caused by the rotation of the rotation shaft. Also, when the differential sealing pressure is high, the pressure of the combustion gas is guided from the pressure guiding grooves to the space between the outer peripheral surface of the leaf seal ring and the inner peripheral surface of the stator section to absorb the pushing force of the leaf springs. Therefore, the leaf seal ring is moved towards the inner peripheral region to come closer to the rotation shaft. Therefore, it is possible to reduce the space generated by thermal expansion and reducing the amount of gas leakage through the space between the rotation shaft and the tips of the leaf springs from the high-pressure-region to the low-pressure-region.

According to the shaft seal structure described above, the pushing member may be provided in the leaf seal ring side.

Therefore, by attaching the leaf seal ring to an existing stator section that does not have pushing members, the pushing members may be provided easily between the stator section and the leaf seal ring, without undertaking special fabrication of interior of the stator section. Also, because the pushing members provided on the leaf seal side can be detached more easily than the pushing members attached to the stator section, when a pushing member is deteriorated or damaged, maintenance and other work on the pushing members are facilitated.

According to the third aspect of the shaft seal structure described above, the pushing member may be provided in a holding members that are separated from the stator section, and the holding member may be provided in the stator section region.

Therefore, it is not necessary to provide a pushing members inside the stator section. In stead of that, it is possible to provide a pushing member between the leaf seal ring and the stator section by attaching a holding members holding the pushing member to the stator section. Also, if a pushing member is deteriorated or damaged, it is possible to detach the pushing members from the holding members. Therefore, it is possible to do a maintenance routine more efficiently.

According to a fourth aspect of the present invention, the foregoing shaft seal structure is characterized in that in any one of the shaft seal structures, the pushing member is provided in the high-pressure-region as well as in the low-pressure-region while putting each planar plates between the pushing members.

Therefore, the leaf seal ring can be floated stably towards the outer peripheral side of the rotation shaft so that, when the rotation shaft is operated at low speeds, it is possible to ensure that the tip of the planar plates do not contact the peripheral surface of the rotation shaft. Also, compared with the case in which the pushing member is provided only on one side of the planar plates, the load exerted by the leaf seal ring on the pushing member can be reduced to a half. Therefore, degradation caused by the load on the pushing member by the leaf seal ring can be controlled.

A turbine according to a fifth aspect of the present invention it is characterized in that a high-temperature-high-pressure fluid is introduced into a turbine casing, a shaft seal structure is provided to a turbine for generating a motion force by converting a thermal fluid energy to a kinetic rotational force by blowing the fluid to a rotor blade which is attached to the rotation shaft which is slidably supported.

According to a fifth aspect of the present invention, a turbine is characterized in having shaft seals which can obtain the same effect as the effects obtained by the above-mentioned seal structure.

According to the first aspect of the turbine described above, beneficial effects of the shaft seal structure described above are accrued to the turbine to improve its performance.

As explained above, according to a first aspect of the present invention, the shaft seal structure and the turbine having the shaft seal structure has the following advantages.

The shaft seal structure is based on providing, between the stator section and the leaf seal ring, pushing members that force the leaf seal ring to move away from the rotation shaft in the radial direction, and pressure guiding grooves that guide the pressure of the high-pressure-region to a space between the outer peripheral surface of the leaf seal ring and the stator section, with the planar plates serving as the boundary.

According to this structure, when the differential sealing pressure is low and the planar plates cannot be exposed to sufficient floating force during the slowspeed operation, the leaf seal ring is forced by the pushing members towards outer radial side of the leaf seal ring inside the stator section, so that the tips of the planar plates provided on the leaf seal ring and the peripheral surface of the rotation shaft are kept in the non-contact state, thus preventing the wear between the planar plates and the rotation shaft caused by the rotation of the rotation shaft. Also, when the differential sealing pressure is high, the pressure of the combustion gas is guided from the pressure guiding grooves to the space between the outer peripheral surface of the leaf seal ring and the inner peripheral surface of the stator section to absorb the pushing force of the leaf springs, so that the leaf seal ring is moved towards the inner peripheral side to come closer to the rotation shaft, thereby enabling the tips of the planar plates to contact the peripheral surface of the rotation shaft at a specific pressure, thereby reducing the amount of gas leakage through the space between the rotation shaft and the tips of the leaf springs from the high-pressure-region to the low-pressure-region.

According to a second aspect of the present invention, the shaft seal structure is characterized in that the pushing members are located on the leaf seal ring side, and therefore, by attaching this leaf seal ring to an existing stator section that does not have pushing members, pushing members may be provided between the stator section and leaf seal ring without undertaking special fabrication of the interior of the stator section.

Also, because the pushing members provided on the leaf seal side can be detached more easily than the pushing members attached to the stator section, when a pushing member is deteriorated or damaged, maintenance and other work on the pushing members are facilitated.

According to a third aspect of the present invention, it is characterized in that, in the shaft seal structure, because the pushing member is provided in a holding member that is separated from the stator section, and the holding member is provided in the stator section side, when the pushing members are to be installed, the pushing members between the leaf seal ring and the stator section may be provided simply by attaching the holding section that holds the pushing member to the stator section, without the need to specially fabricate the interior of the stator section for attaching the pushing member directly. Also, if a pushing member is deteriorated or damaged, only the holding member holding the relevant pushing member needs to be detached from the stator section so that maintenance of pushing member can be performed efficiently.

According a fourth aspect of the present invention, it is characterized in that, in the shaft seal structure, because the pushing members are provided in the high-pressure-region as well as in the low-pressure-region, with the planar plates intervening between two pressure regions, the leaf seal ring can be floated stably towards the outer peripheral side of the rotation shaft inside the stator section so that, when the rotation shaft is operated at low speeds, it is possible to ensure that the tips of the planar plates do not touch the peripheral surface of the rotation shaft. Also, compared with the case of providing the pushing member only on one side of the planar plates, the load exerted by the leaf seal ring on the pushing member is reduced to a half so that degradation caused by the load on the pushing member by the leaf seal ring can be controlled.

According to a fifth aspect of the present invention, it is characterized in that, in the turbine, a fluid is guided at a high temperature and under a high pressure to a casing in such a way to blow the fluid at blades fixed to the rotation shaft rotatably supported inside the casing, so as to generate motion power by converting thermal energy of a fluid to rotational energy having the shaft seal structure, because the turbine is provided with any one of the shaft seal structures described above, beneficial effects of the shaft seal structure are accrued to the turbine to improve its performance.

DESCRIPTION OF THE PREFERRED EMBODIMENTS

In the following, the shaft seal structure of the present invention and various embodiments of the turbine having the shaft seal structure will be explained, but the present invention is not to be interpreted as limiting to the illustrated cases. Also, the turbine relating to the present invention will be demonstrated using a gas turbine, but the turbines applicable to the present invention are not limited to the gas turbine in particular.

The first embodiment will be explained with reference to FIGS. 1 to 7.

Figure 1:
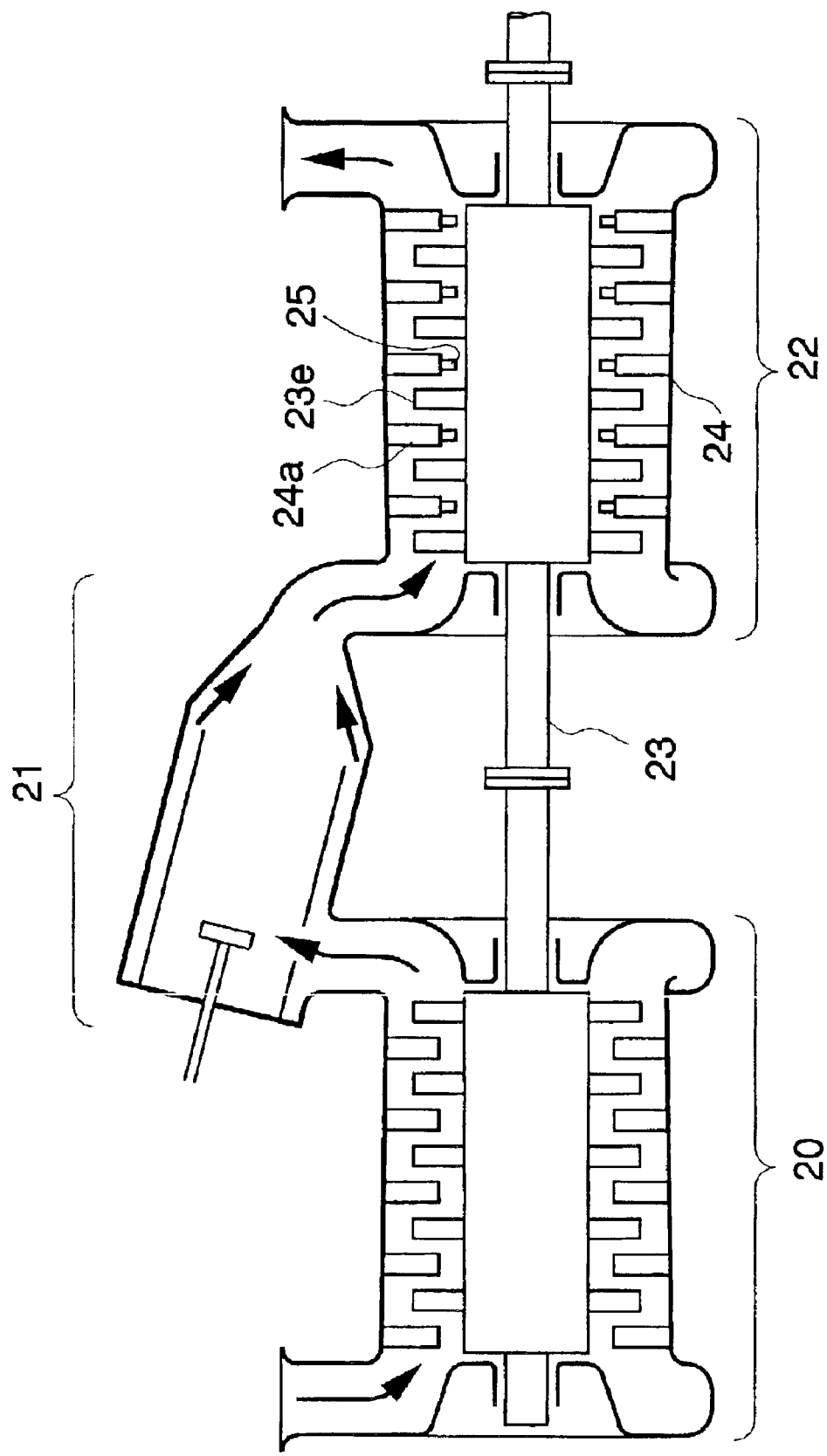
FIG. 1 is a schematic diagram of a first embodiment of a turbine having the shaft seal structure of the present invention.

FIG. 1 shows a schematic structure of the gas turbine. In the diagram, a reference numeral 20 indicates to a compressor. A reference numeral 21 indicates a burner. A reference numeral 22 indicates a turbine. The compressor 20 introduces a large volume of air therein and compresses the air. Normally, a gas turbine utilizes a portion of the motion power obtained from the rotation shaft 23 as a motion power for the compressor 20. The burner 21 mixes a fuel into the compressed air from the compressor and combusts the gaseous mixture. The turbine 22 admits combustion gas (fluid) generated in the burner 21 and expands the gas so as to blow the expanded gas against the moving blades 23e provided on the rotation shaft 23, thereby converting the thermal energy of the combustion gas into mechanical energy to generate motion power.

In the turbine 22, in addition to the plurality of moving blades 23e provided on the rotation shaft 23, there are provided a plurality of stator blades (stator section) 24a on the casing 24 side. The moving blades 23e and the stator blades 24a are arranged alternatingly on the rotation shaft 23 in the axial direction. The moving blades 23e are compressed by the combustion gas flowing in the axial direction of the rotation shaft 23 to rotate the rotation shaft 23, and the rotational energy given to the rotation shaft 23 is transmitted through the shaft end to be used. Between the stator blades 24a and the rotation shaft 23, there is a leaf seal 25 to serve as the shaft seal structure for the purpose of blocking the combustion gas to flow through the ring-shaped space, formed by the stator blades 24a and the rotation shaft 23, in the axial direction of the rotation shaft 23 from the high-pressure-region to the low-pressure-region.

Figure 2:
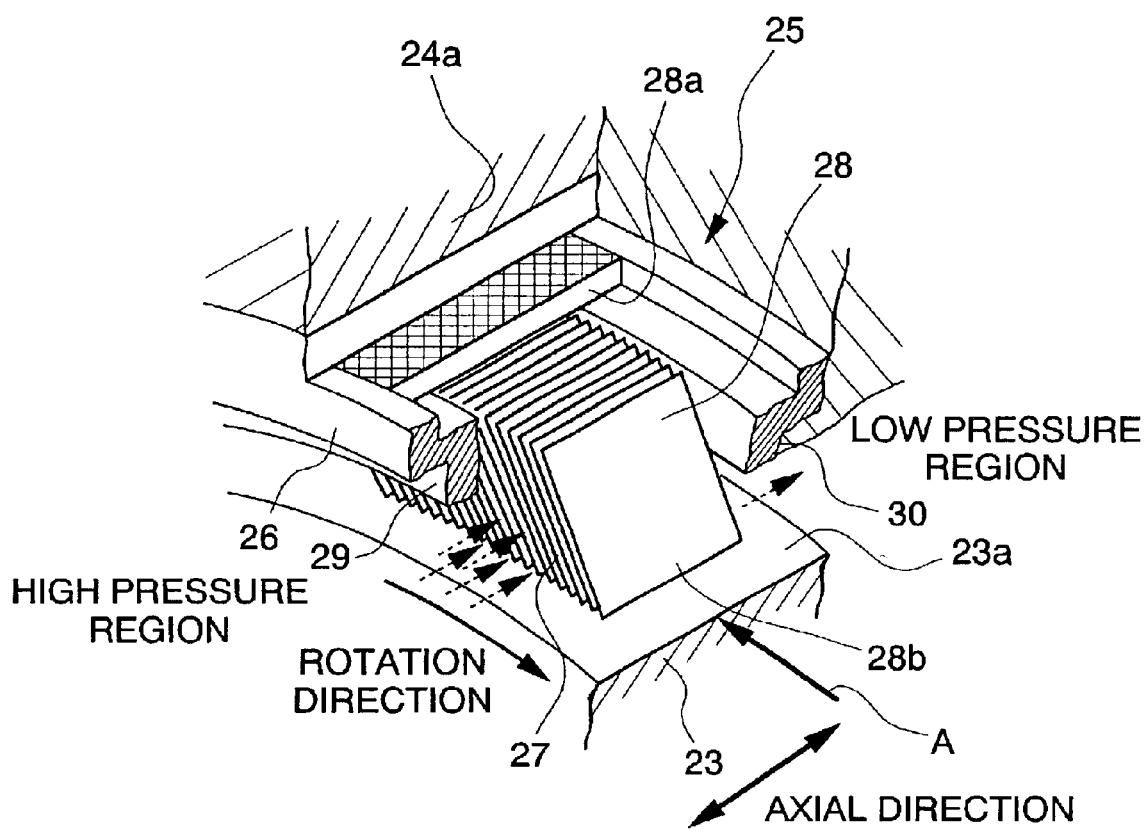
FIG. 2 is a perspective view of the leaf seal (shaft seal structure) in the first embodiment.

The leaf seal 25, as shown in FIG. 2, comprises a leaf seal ring 26 retained on the inner section of the stator blades 24a, and a plurality of planar plates 28, whose widths are oriented in the axial direction of the rotation shaft 23 and the leaves are separated from each other by a space 27 therebetween. The outer peripheral ends 28a are fixed inside the leaf seal ring 26 and the tips 28b are disposed so as to form an acute angle with the peripheral surface 23a of the rotation shaft 23 to make a slidable contact with the peripheral surface 23a of the rotation shaft 23. The leaf seal ring 26 is provided with a high-pressure-region plate 29 on the high-pressure-region and a low-pressure-region plate 30 on the low-pressure-region so as to surround the planar plates 28 therebetween, to serve as pressure guiding plates that are operated in the pressurized direction. Each planar plate 28 has a certain elasticity that is dependent on the plate thickness in the axial direction of the rotation shaft, and, in the peripheral direction of the rotation shaft 23, it exhibits soft flexibility.

Figure 3:
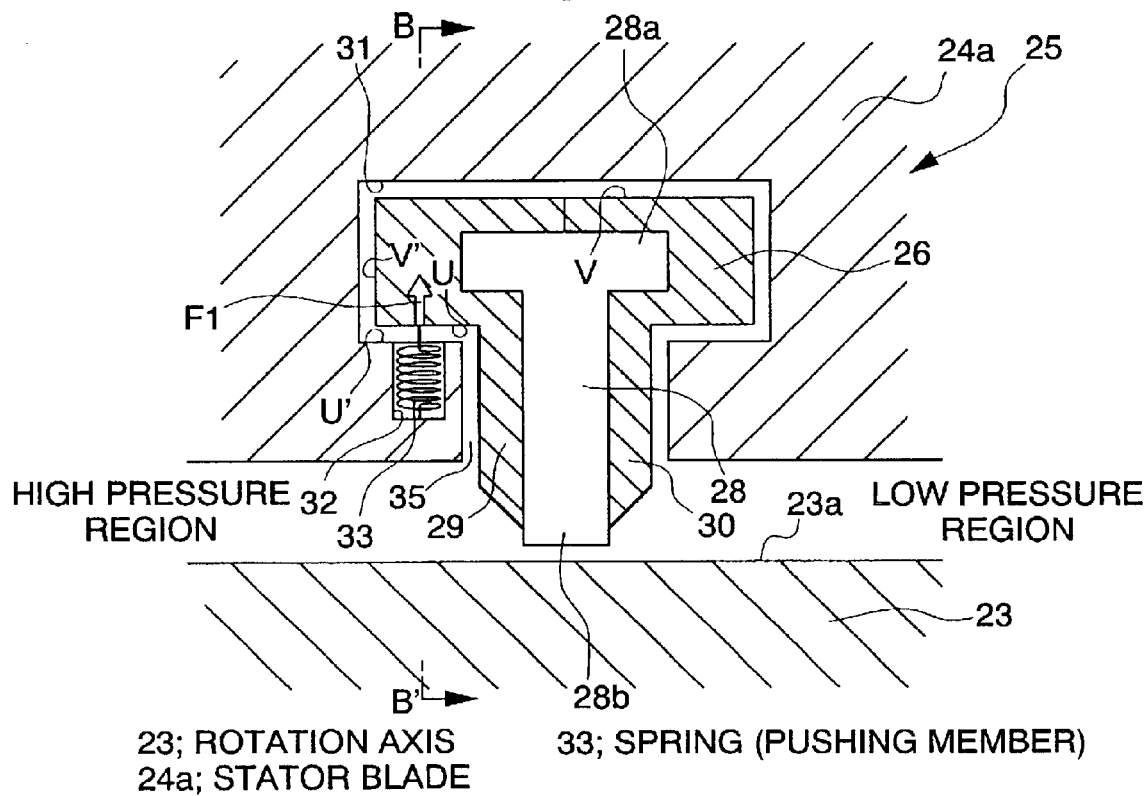
FIG. 3 is a cross section of the leaf seal viewed in a plane of the axis of the rotation shaft in the first embodiment.

FIG. 3 shows a cross section of the leaf seal 25 viewed in the direction of the arrow A in FIG. 2. As shown in this diagram, the horizontal cross sectional surface of the leaf seal 26 and the planar plates 28 are T-shaped. The leaf seal ring 26 is held inside the T-shaped, concave section 31 of the stator blade 24a by inserting its head section in the outer peripheral side. The concave section 31 of the stator blade 24a is made slightly larger than the exterior dimensions of the leaf seal ring 26 so that it is able to move in the axial and radial directions of the rotation shaft 23 inside the concave section 31.

In the stator blade 24a, a hole 32 is formed on the wall surface U' that faces the head section bottom surface U located on the high-pressure-region of the leaf seal ring 26. Inside the hole 32, there is provided a spring (pushing member) 33 whose one end is fixed to the bottom surface of the hole 32, and the other end is fixed to the head section bottom surface U on the high-pressure-region of the leaf seal ring 26. The spring 33 forces the leaf seal ring 26 towards the outer radial direction so as to move it away from the rotation shaft 23.

Figure 4:
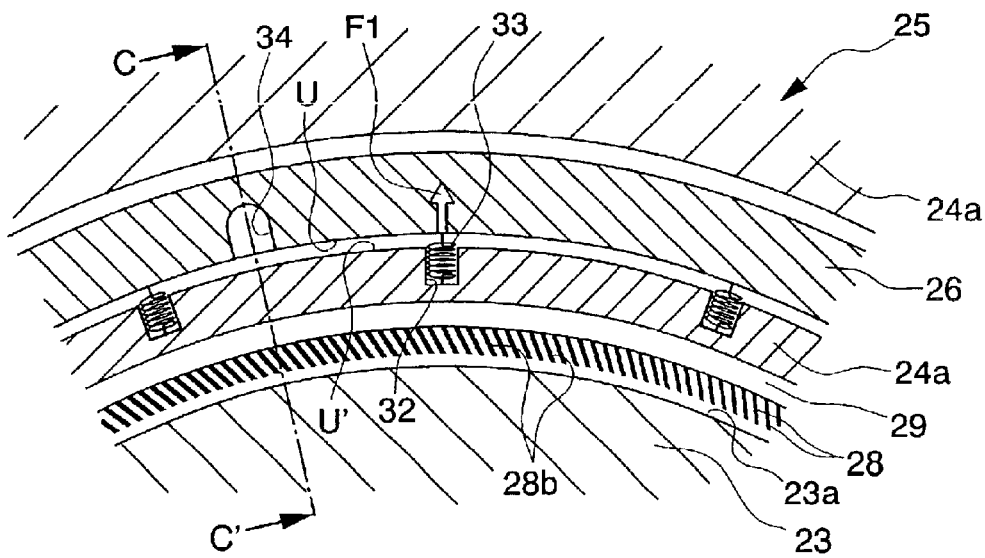
FIG. 4 is a cross section of the leaf seal viewed in a plane B–B' in the first embodiment.

FIG. 4 is a cross section of the leaf seal ring 26 viewed in a plane B–B' in FIG. 3. As shown in the drawing, a plurality of springs 33 are provided with equal spacing therebetween in the peripheral direction of the rotation shaft 23. Because of this disposition, when the rotation shaft 23 is stopped or operating at low speeds, the leaf seal ring 26 is forced to float inside the concave section 31 of the stator blade 24a due to the pushing force F1 of the springs 33 (i.e., leaf seal ring 26 becomes expanded). Accordingly, when the rotation shaft 23 is stopped or rotating at low speeds, the tips 28b of the planar plates 28 disposed inside the leaf seal ring 26 are in a non-contact state with the peripheral surface 23a of the rotation shaft 23.

In the high-pressure-region of the leaf seal ring 26, a plurality (four) of pressure guiding grooves 34 of an arch-shape are provided on the head section bottom surface U at an equal interval in the peripheral direction of the leaf seal ring 26.

Figure 5:
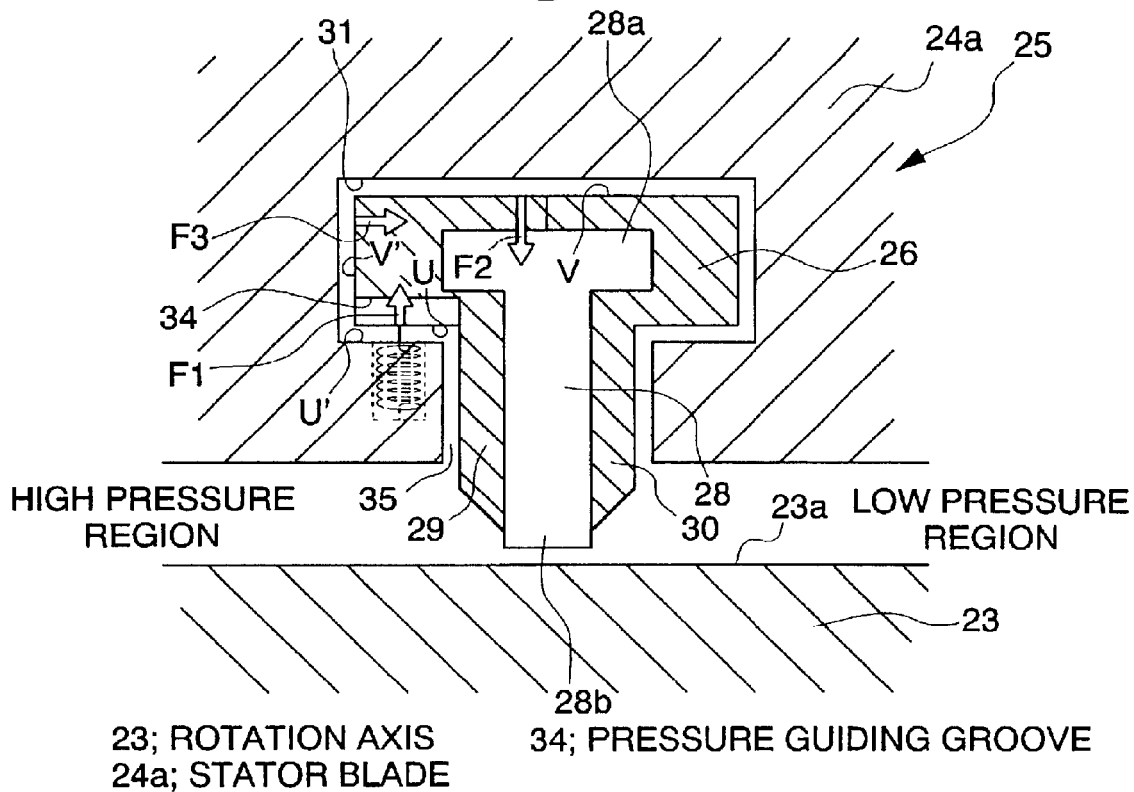
FIG. 5 is a cross section of the leaf seal viewed in a plane C–C' in the first embodiment.

FIG. 5 shows a cross section of the leaf seal 25 viewed in a plane C–C'. As shown in this diagram, each pressure guiding groove 34 is formed so as to extend along the axial direction of the rotation shaft 23, and communicates with the space 35 between the concave section of the stator blade 24a and the high-pressure-region plate 29 of the leaf seal ring 26.

In the leaf seal 25, when the differential sealing pressure becomes high, the combustion gas between the rotation shaft 23 and the stator blade 24a comes in from the space 35 between the concave section 31 of the stator blade 31a and the leaf seal ring 26, and passes through between the head section bottom surface U of the leaf seal ring 26 and the wall surface U' of the concave section 31 as well as through the pressure guiding grooves 34, and reaches a space between the outer peripheral surface of the leaf seal ring 26 and the inner peripheral surface of the concave section 31. Then, due to the pressure of the combustion gas, a force F2 acts on the upper surface V of the leaf seal ring 26 so that the leaf seal ring 26 is compressed towards the inner periphery, and a force F3 acts on the head section lateral surface V' on the high-pressure-region to press the leaf seal ring 26 towards the low-pressure-region.

Figure 6:
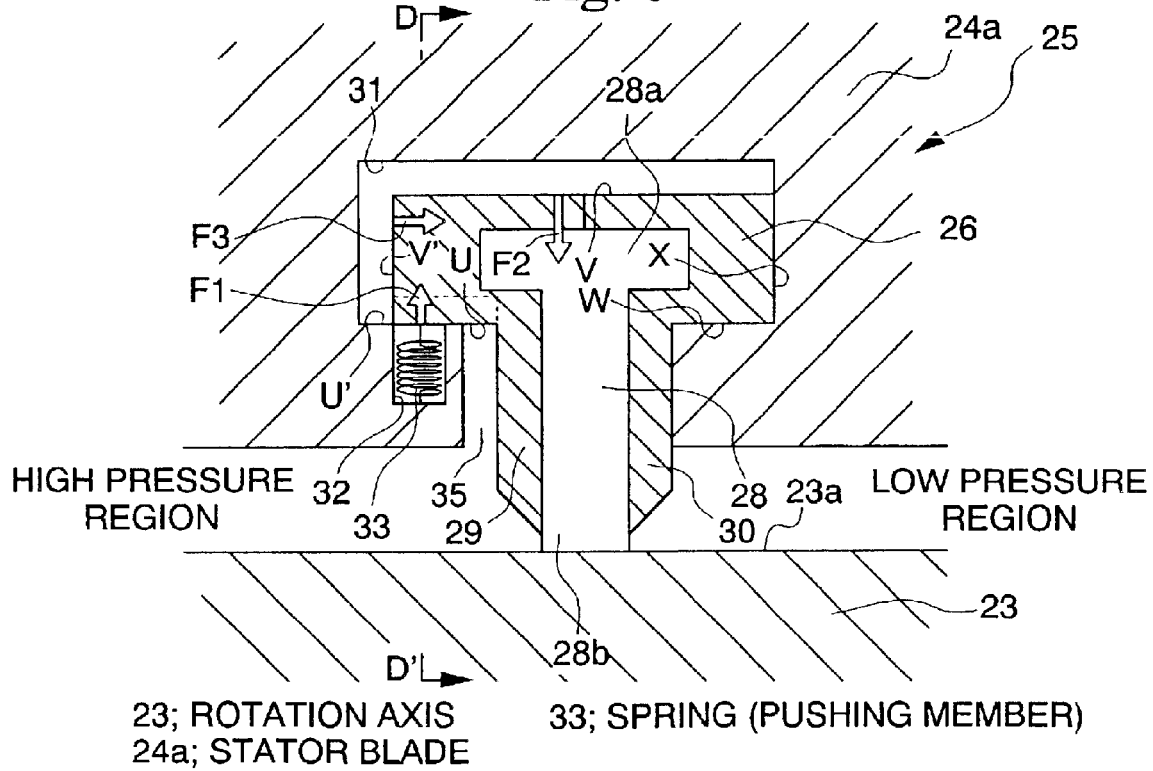
FIG. 6 a cross section of the leaf seal viewed in a plane of the axis of the rotation shaft in the first embodiment.
Figure 7:
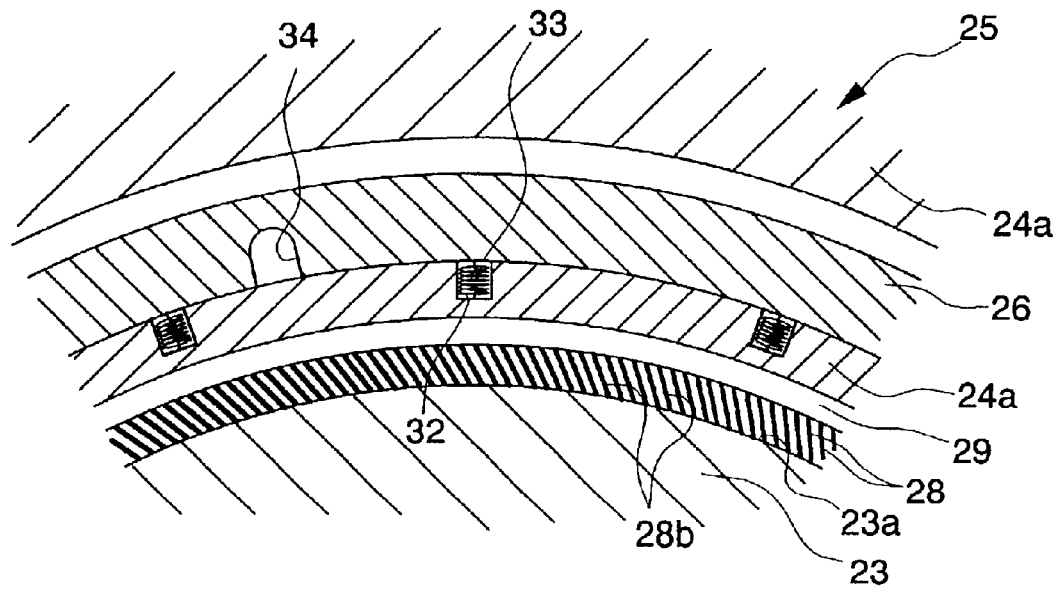
FIG. 7 is a cross section of the leaf seal viewed in a plane D–D' in the first embodiment.

When the force F2 acting on the upper surface V of the leaf seal ring 26 absorbs the pushing force F1 of the springs 33 that acts to float the leaf seal ring 26 towards the outer peripheral side, the leaf seal ring 26 moves towards the inner peripheral side, and the head section bottom surface U on the high-pressure-region and the head section bottom surface W on the low-pressure-region of the leaf seal ring 26 abut the inner surface of the concave section 31, as shown in FIG. 6. Therefore, as shown in FIG. 7, the space between the tips 28b of the planar plates 28 provided on the leaf seal ring 26 and the inner peripheral surface 23a of the rotation shaft 23 is decreased, resulting in a very narrow space. When this condition is created, it enables to decrease the flow of combustion gas flowing towards the low-pressure-region along the axial direction of the rotation shaft 23 through the ring-shaped space between the stator blade 24a and the rotation shaft 23.

Also, as shown in FIG. 6, because the head section lateral surface V' of the leaf seal ring 26 is compressed towards the low-pressure-region by force F3, it moves towards the low-pressure-region inside the concave section 31, resulting in the head section lateral surface X on the low-pressure-region, the head section bottom surface W and the low-pressure-region plate 30 on the low-pressure-region, respectively, to abut the inner peripheral surfaces of the concave section 31. Therefore, the combustion gas guided to the space between the inner peripheral surfaces of the concave section 31 and the leaf seal ring 26 does not escape into the low-pressure-region, thereby preserving the high performance of the seal.

Even after the overall leaf seal ring 26 has moved to the inner peripheral side, the pressure of the combustion gas on the high-pressure-region is guided from the pressure guiding grooves 34 communicating with the space between the concave section 31 and the leaf seal ring 26 to the upper surface V of the leaf seal ring 26 and the head section lateral surface V' on the high-pressure-region.

According to the leaf seal 25 having the structure described above, during the lowspeed operation of the rotation shaft 23, when the differential sealing pressure is low and the planar plates 28 are not being floated sufficiently, the leaf seal ring 26 is pushed towards the outer radial direction by the action of the springs 33, and it is floated in the direction away from the rotation shaft 23 inside the concave section 31 of the stator blade 24a, thereby keeping the tips 28b of the planar plates 28 provided on the leaf seal ring 26 and the peripheral surface 23a of the rotation shaft 23 in the non-contact state. It follows that the wear of the planar plates 23 and the rotation shaft 23 due to the rotation action of the rotation shaft 23 is prevented.

Also, when the differential sealing pressure is high, the pressure in the high-pressure-region is guided from the pressure guiding grooves 34 to the space between the outer peripheral surface of the leaf seal ring 26 and the concave section 31 of the stator blade 24a, causing the pressure of the combustion gas to absorb the pushing force of the leaf spring 33 so as to permit the leaf seal ring 26 to move towards the inner peripheral side to be near the rotation shaft 23, so that the tips 28b of the planar plates 28 contact the peripheral surface 23a of the rotation shaft 23 at a specific pressure. In this condition, the amount of gas leaking through the space between the rotation shaft 23 and the end sections 28b of the planar plates 28 from the high-pressure-region to the low-pressure-region is reduced.

Another embodiment according to the present invention is explained as follows with reference to drawings. Here, it should be noted that those structural elements that are similar to those in the first embodiment are referred to by the same reference numerals, and their explanations are omitted, and new reference numerals and explanatory remarks will be provided only for those structural elements that are different from those in the first embodiment. The simplified structure of the turbine used in the first embodiment will be retained and the explanation is omitted.

A second embodiment of the present invention will be explained with reference to FIGS. 8 and 9.

Figure 8:
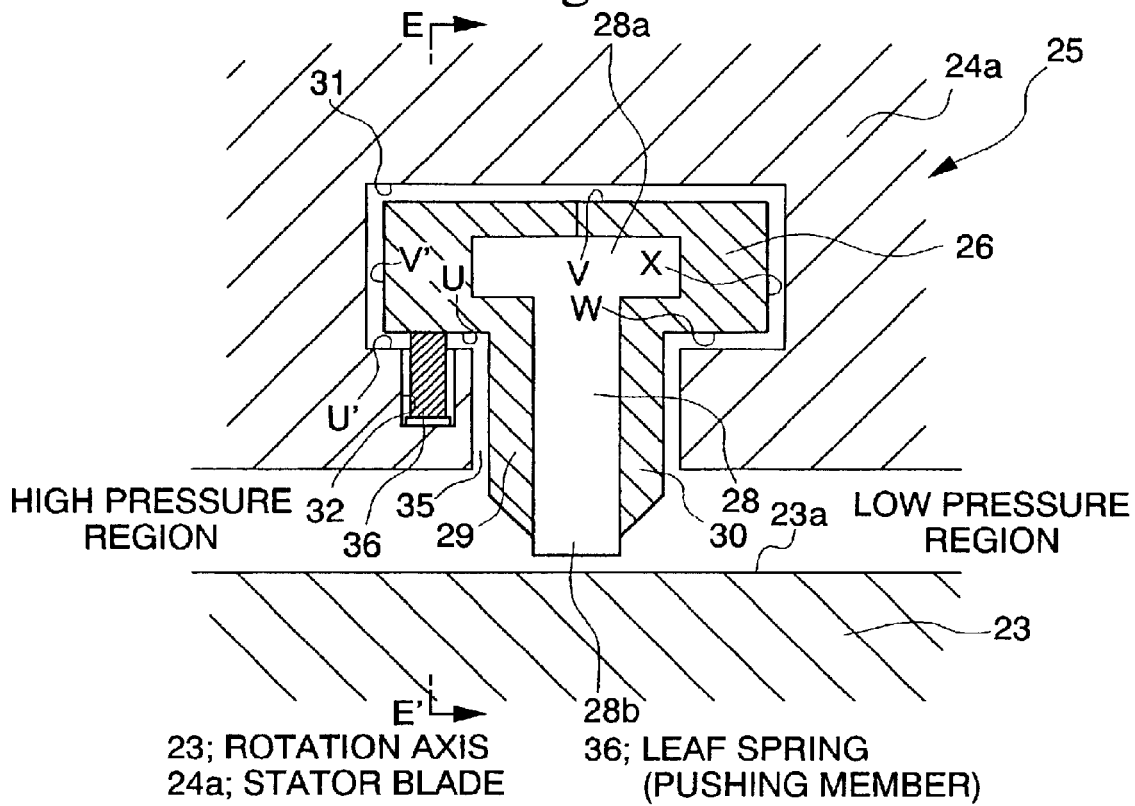
FIG. 8 is a cross section of a leaf seal viewed in a plane of the axis of the rotation shaft in a second embodiment.
Figure 9:
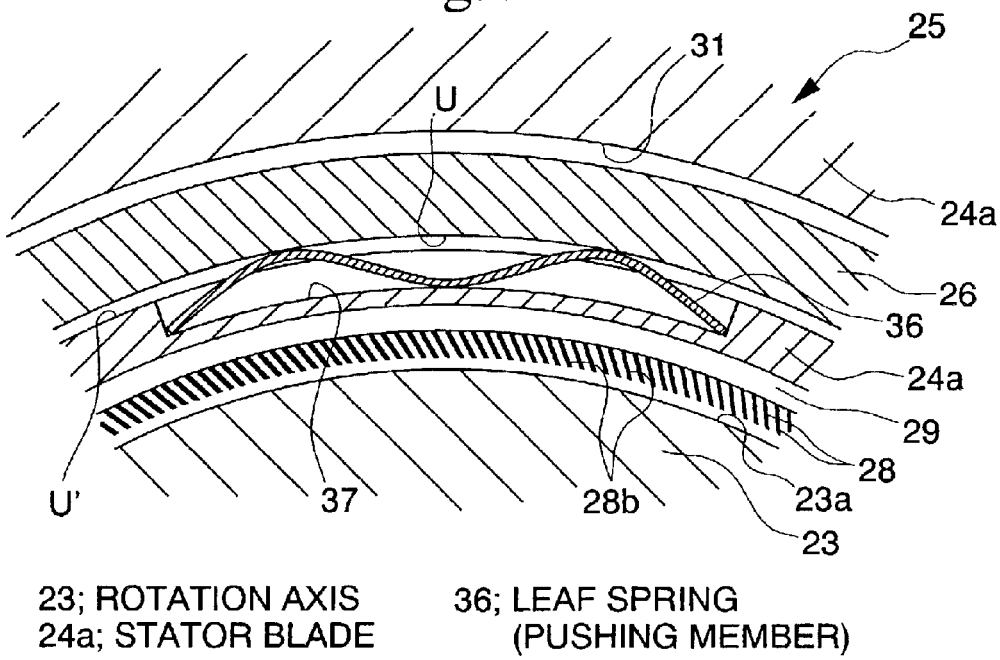
FIG. 9 is a cross section of the leaf seal viewed in a plane E–E' in the second embodiment.

FIG. 8 shows a cross section of the leaf seal 25 and the stator blade 24a, and FIG. 9 shows a cross section through a plane E–E' of the leaf seal 25 and the stator blade 24a shown in FIG. 8. A reference numeral 36 in FIGS. 8, 9 indicates a wave-shaped leaf spring. A reference numeral 37 indicates a long hole formed in the concave section 31 of the stator blade 24a for containing the leaf spring 36.

Accordingly, the leaf seal 25 in the second embodiment utilizes leaf springs 36 instead of the springs 33 used in the leaf seal 25 in the first embodiment.

According to the leaf seal 25 in the second embodiment, there is no need for fixing each end of the spring 33 to the stator blade 24a and to the leaf seal ring 26, so that by simply inserting the leaf spring 36 in the long hole 37 formed in the stator blade 24a, it is possible to provide the leaf spring 37 between the stator blade 24a and the leaf seal ring 26.

Also, as similarly in the first embodiment, when the differential sealing pressure is low and the planar plates 28 cannot be exposed to sufficient floating force during the low-speed operation, the leaf seal ring 26 is floated inside the concave section 31 of the stator blade 24a, in the direction to separate it from the rotation shaft 23 by each leaf spring 36, so that the tips 28b of the planar plates 28 and the peripheral surface 23a of the rotation shaft 23 are kept in the non-contact state, thus preventing the wear between the planar plates 28 and the rotation shaft 23 caused by the rotation of the rotation shaft 23. When the differential sealing pressure is high, the pressure of the combustion gas guided from the pressure guiding grooves 34 to the space between the outer peripheral surface of the leaf seal ring 26 and the inner peripheral surface of the concave section 31 of the stator blade 24a absorbs the pushing force of the leaf springs 36, so that the tips 28 of the leaf spring 28 are made contact the peripheral surface 23a of the rotation shaft 23 with a predetermined pressure, thereby reducing the amount of gas leakage through the space between the rotation shaft 23 and the leaf springs 28 from the high-pressure-region to the low-pressure-region.

Next, a third embodiment of the invention will be explained with reference to FIGS. 10 and 11.

The leaf seal 25 in the third embodiment is designed so that the springs 35 used in the leaf seal 25 in the first embodiment are held individually in holding members that are separated from the stator blade 24a.

In the following, the holding member will be explained in detail.

Figure 10:
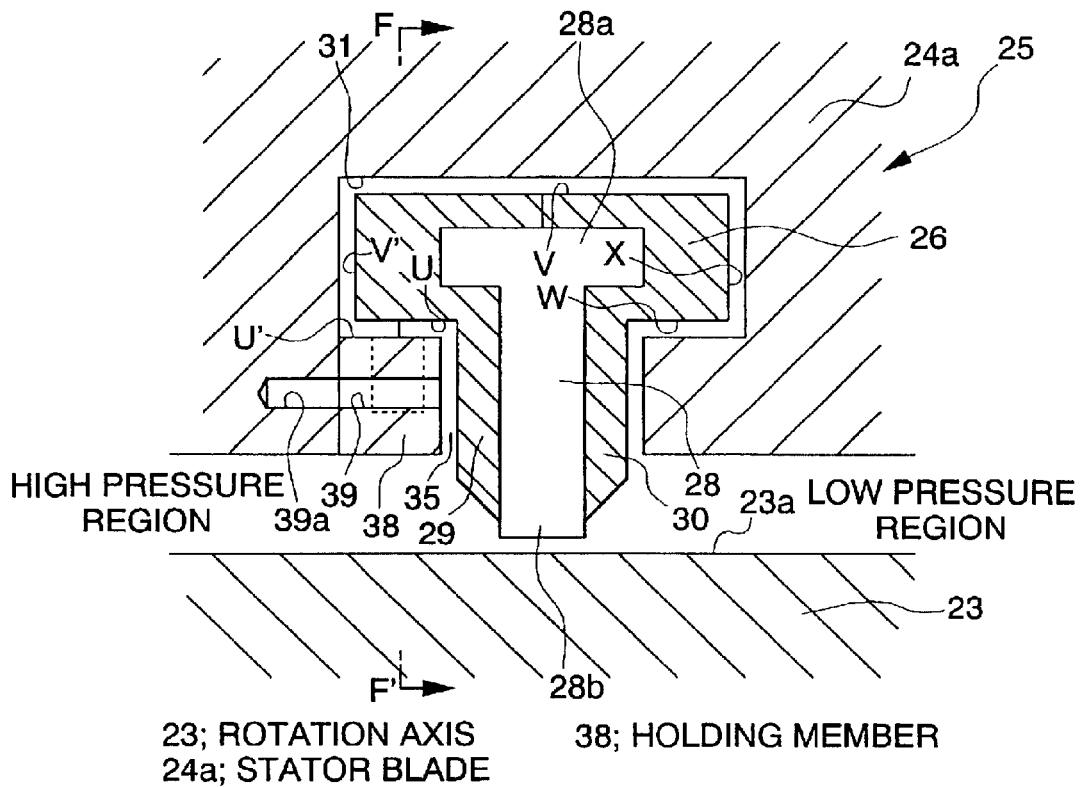
FIG. 10 is a cross section of a leaf seal viewed in a plane of the axis of the rotation shaft in a third embodiment.

A reference numeral 38 in FIG. 10 indicates a holding member. The holding member 38 comprises a portion obtained by dividing the ring into a plurality of segments in the radial direction, and when attached to the stator blade 24a, forms a concave section 31 for holding the head section of the leaf seal ring 26 in conjunction with the stator blade 24a.

Figure 11:
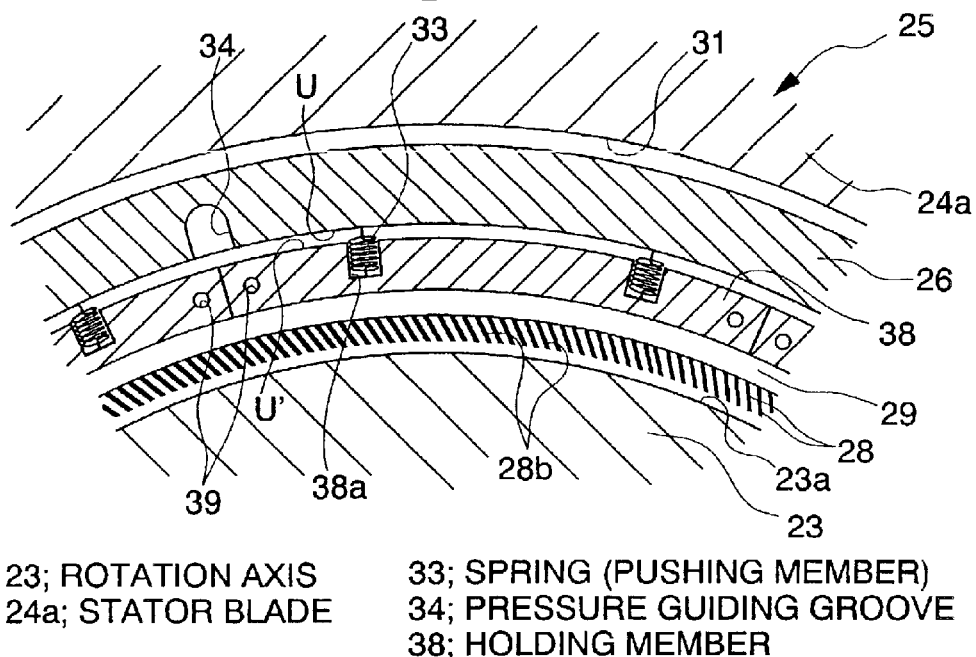
FIG. 11 is a cross section of the leaf seal viewed in a plane F–F' in the third embodiment.

FIG. 11 is a cross section of the leaf seal 25 and the holding member 34 viewed in a plane F–F' in FIG. 10. As shown in FIGS. 10 and 11, in the holding member 38, a bolt insertion hole 39 is provided in each end section for inserting a bolt into the stator blade 24a. Also, between the insertion holes 39, two holes 38a are provided for holding the springs 33 therein.

To attach the holding member 38 to the stator blade 24a, a bolt (not shown) is inserted into the insertion hole 39, and the thread section of the bolt is engaged to the bolt hole 39a formed on the stator blade 24a. In so doing, the holding member 38 is attached to the stator blade 24a.

The springs 33 may be provided between the leaf seal ring 26 and the stator blade 24a along the peripheral direction of the rotation shaft 23 by following a similar procedure to attach a plurality of holding sections 38 to the stator blade 24a.

According to the leaf seal 25 in the third embodiment, there is no need for attaching the springs 33 directly to the inside of the stator blade 24a, springs 33 may be provided between the leaf seal ring 26 and the stator blade 24a simply by attaching the holding members 38 that hold respective springs 33 to the stator blade 24a. Also, compared with the case of fabricating holes 32 or long holes 37 in the stator blade 24a, holes 38a can be easily fabricated. Further, if a spring 33 is deteriorated or damaged, only the holding member holding that spring must be removed from the stator blade 24a so that work of maintaining the springs 33 is efficient.

Also, as similarly to the case of the first embodiment, when the differential sealing pressure is low and sufficient floating force cannot be applied to the planar plates 28 in a low-speed operation of the rotation shaft 23, the leaf seal ring 26 is floated inside the concave section 31 in the direction to move it away from the rotation shaft 23 due to the action of the springs 33 so that the tips of the planar plates 28 and the peripheral surface of the rotation shaft 23 are maintained in the non-contact state, thus enabling to prevent the wear of the planar plates 28 and the rotation shaft 23 caused by the rotation of the rotation shaft 23. When the differential sealing pressure is high, the pressure of the combustion gas guided from the pressure guiding grooves 34 to the space between the outer peripheral surface of the leaf seal ring 26 and the inner peripheral surface of the concave section 31 of the stator blade 24a absorbs the pushing force of the leaf spring 33 so that the tips 28b of the planar plates 28 contact the peripheral surface 23 of the rotation shaft 23 at a specific pressure. In this condition, the amount of gas leaking through the space between the rotation shaft 23 and the planar plates 28 from the high-pressure-region to the low-pressure-region is reduced.

Further, instead of the springs 33, similar to the case of the leaf seal 25 in the second embodiment, a leaf springs 36 may be used. Also, the number of insertion holes 39 and the springs 33 provided in each holding member 38 must not be limited to two, such that any number of parts need for the application may be provided. Similarly, the length of the holding member 38 may be set to any length required.

Next, a fourth embodiment of the invention will be explained with reference to FIGS. 12 and 13.

The leaf seal 25 in the fourth embodiment is provided with springs 33 on the head section bottom surface U in the high-pressure-region of the leaf seal ring 26 in the leaf seal 25 presented in the first embodiment.

Figure 12:
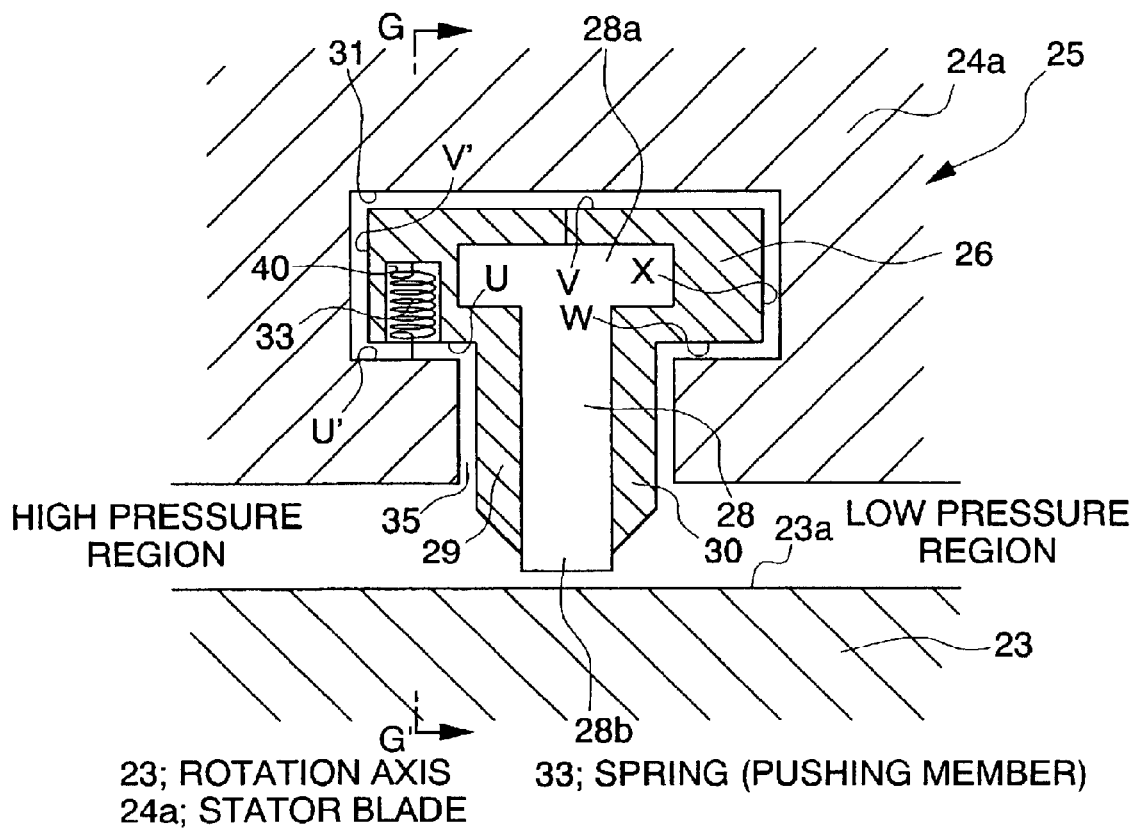
FIG. 12 is a cross section of a leaf seal viewed in a plane of the axis of the rotation shaft in a fourth embodiment.

A reference numeral 40 in FIG. 12 indicates a hole formed in the head section bottom surface U of the leaf seal ring 26. A spring 33 is provided in a hole 40.

Figure 13:
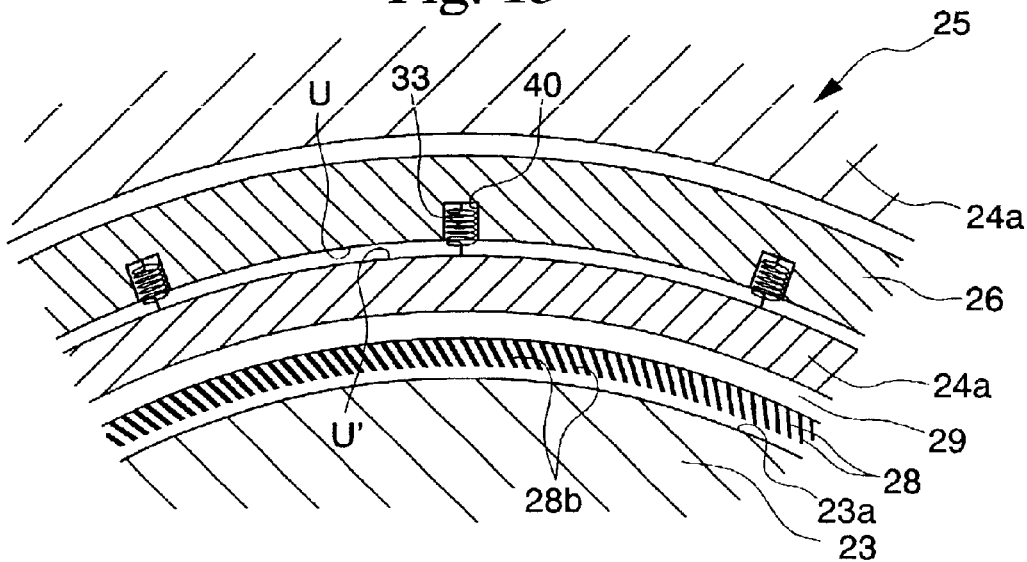
FIG. 13 is a cross section of the leaf seal viewed in a plane G–G' in the fourth embodiment.

The holes 40 and the springs 33, as shown in FIG. 13, are provided in plurality along the peripheral direction of the leaf seal ring 26.

According to the leaf seal 25 in the fourth embodiment, by attaching a leaf seal ring 26 not having springs 33 in the concave sections 31 of the existing stator blade 24a that have no springs 33, springs 33 may be provided between the stator blade 24a and the leaf seal ring 26, without having the concave section 31 of the stator blade 24a. Also, because the springs 33 are provided on the leaf seal ring 26 side, thereby permitting simpler detachment compared with the case of attachment to the stator blade 24a, if a spring 33 is deteriorated or damaged, work of maintaining the springs 33 is facilitated.

Also, as similarly in the first embodiment, when the differential sealing pressure is low and the planar plates 28 cannot be exposed to sufficient floating force during a low-speed operation, the leaf seal ring 26 is floated inside the concave section 31 of the stator blade 24a, in the direction to separate from the rotation shaft 23 by each spring 33 so that the tips 28b of the planar plates 28 and the peripheral surface 23a of the rotation shaft 23 are kept in the non-contact state, thus preventing the wear between the planar plates 28 and the rotation shaft 23 caused by the rotation of the rotation shaft 23. When the differential sealing pressure is high, the pressure of the combustion gas guided from the pressure guiding grooves 34 to the space between the outer peripheral surface of the leaf seal ring 26 and the inner peripheral surface of the concave section 31 of the stator blade 24a absorbs the pushing force of the springs 33 so that the tips 28 of the leaf spring 28 are made to contact the peripheral surface 23a of the rotation shaft 23 with a predetermined pressure, thereby reducing the amount of gas leakage through the space between the rotation shaft 23 and the leaf springs 28 from the high-pressure-region to the low-pressure-region.

Next, a fifth embodiment of the invention will be explained with reference to FIGS. 14 and 15.

Figure 14:
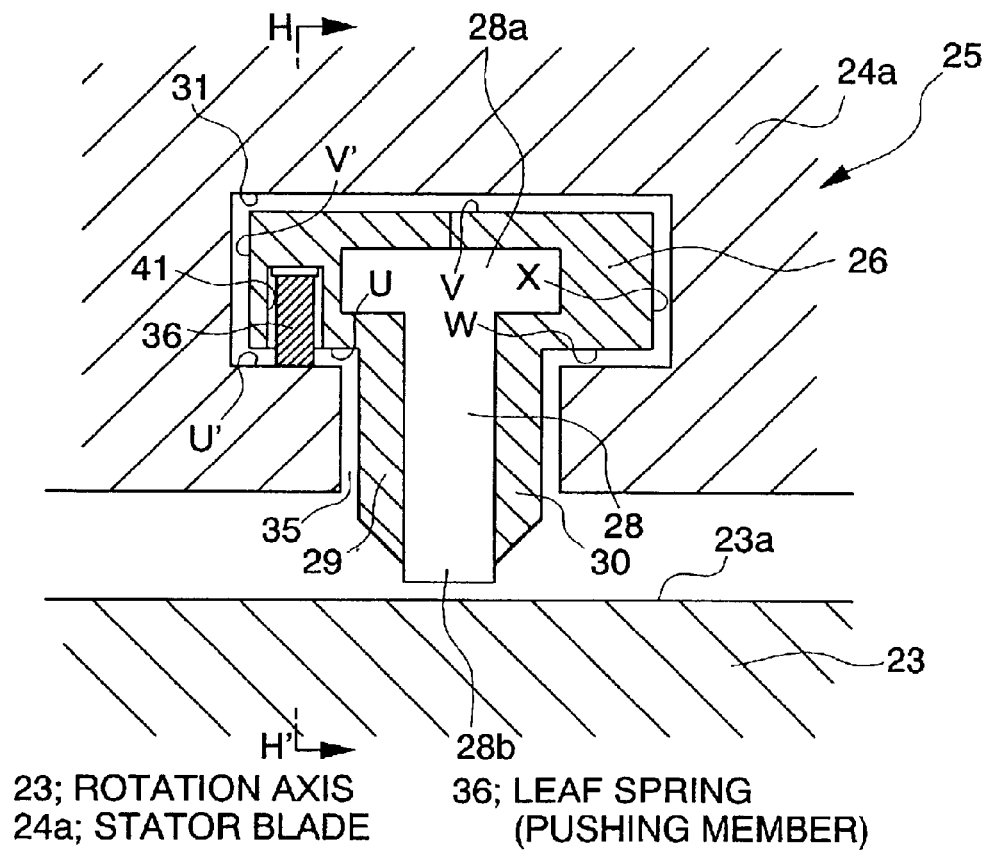
FIG. 14 is a cross section of a leaf seal viewed in a plane of the axis of the rotation shaft in a fifth embodiment.

FIG. 14 shows a cross section of the leaf seal 25 and the stator blade 24a along the axial direction of the rotation shaft 23. FIG. 15 shows a cross section of the leaf seal 25 and the stator blade 24a along a plane H–H' of the leaf seal 25 and the stator blade 24a shown in FIG. 14.

Figure 15:
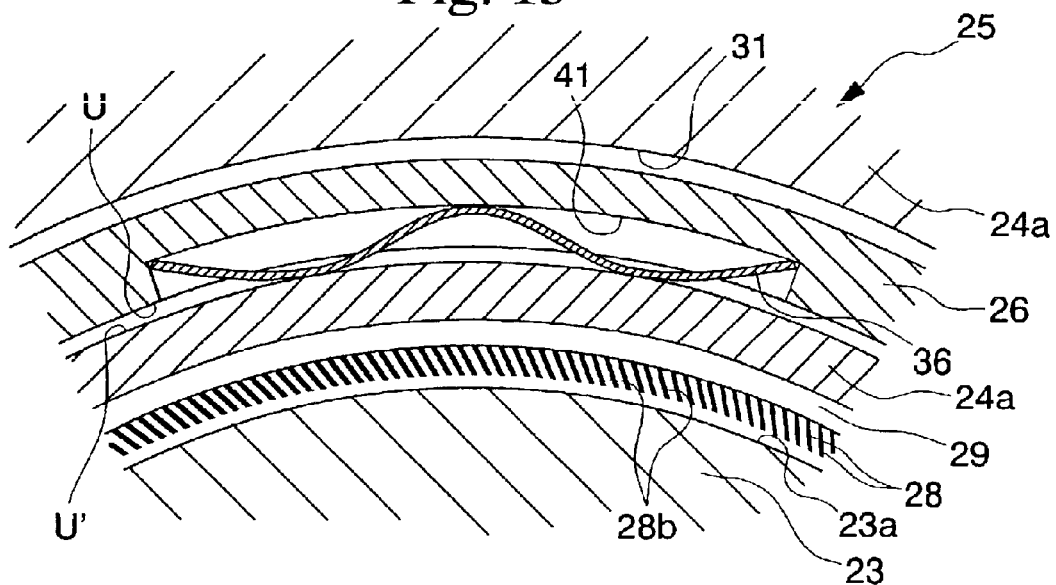
FIG. 15 is a cross section of the leaf seal viewed in a plane H–H' in the fifth embodiment.

A reference numeral 41 in FIGS. 14, 15 indicates a long hole formed in the head section bottom surface U of the leaf seal ring 26. Inside a long hole 41, a leaf spring 36 of a wave-shape is provided.

In other words, the leaf seal 25 in the fifth embodiment utilizes a leaf spring 36 as the pushing member instead of the spring 33 used in the fourth embodiment.

According to the leaf seal 25 in the fifth embodiment, as similarly to the leaf seal 25 the fourth embodiment, by attaching a leaf seal ring 26 having leaf springs 36 in the concave sections 31 of the existing stator blade 24a that have no leaf springs 36, leaf springs 35 may be provided between the stator blade 24a and the leaf seal ring 26, without specially fabricating the concave section 31 of the stator blade 24a. Also, because the leaf springs 36 are provided on the leaf seal ring 26 side, thereby permitting simpler detachment compared with the case of attachment to the stator blade 24a, if a leaf spring 36 is deteriorated or damaged, maintenance of the leaf springs 36 is facilitated.

Further, as similarly in the leaf seal 25 in the second embodiment, there is no need for affixing each end of the spring 33 to the stator blade 24a and the leaf seal ring 26, so that by simply inserting the leaf spring 36 in the long hole 41 formed in the leaf seal ring 26, it is possible to provide the leaf spring 36 between the stator blade 24a and the leaf seal ring 26.

Also, as similarly in the first embodiment, when the differential sealing pressure is low and the planar plates 28 cannot be exposed to sufficient floating force during the low-speed operation, the leaf seal ring 26 is floated inside the concave section 31 of the stator blade 24a, in the direction to separate from the rotation shaft 23 by each spring 33 so that the tips 28b of the planar plates 28 and the peripheral surface 23a of the rotation shaft 23 are kept in the non-contact state, thus preventing the wear between the planar plates 28 and the rotation shaft 23 caused by the rotation of the rotation shaft 23. When the differential sealing pressure is high, the pressure of the combustion gas guided from the pressure guiding grooves 34 to the space between the outer peripheral surface of the leaf seal ring 26 and the inner peripheral surface of the concave section 31 of the stator blade 24a absorbs the pushing force of the springs 33 so that the tips 28 of the leaf spring 28 are made to contact the peripheral surface 23a of the rotation shaft 23 with a specific pressure, thereby reducing the amount of gas leakage through the space between the rotation shaft 23 and the leaf springs 28 from the high-pressure-region to the low-pressure-region.

Figure 16:
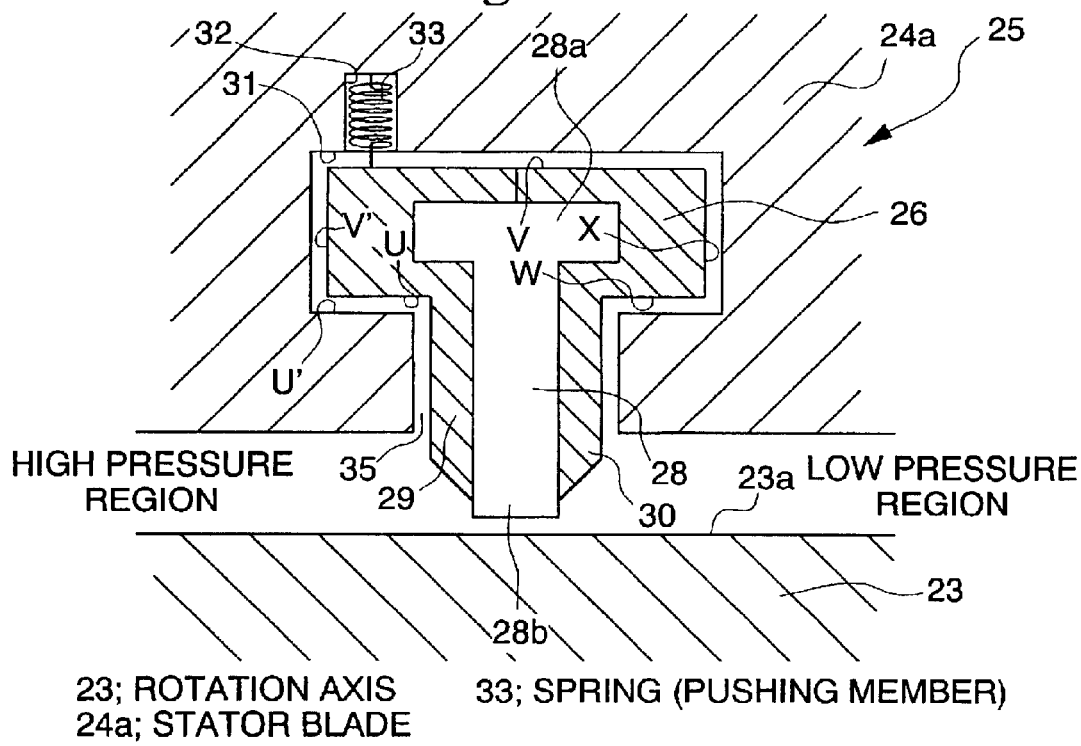
FIG. 16 is a cross section of a leaf seal viewed in a plane of the axis of the rotation shaft in a sixth embodiment.

It should be noted that, in the first to fifth embodiments, although the springs 33 were provided between the head section bottom surface U of the leaf seal ring 26 and the opposing wall surface U' of the stator blade 24a facing the head section bottom surface U, they may be provided between the head section upper surface V of the leaf seal ring 26 and the opposing inner peripheral surface of the concave section 31, as in the sixth embodiment shown in FIG. 16. They may also be provided between the head section bottom surface W of the leaf seal ring 26 on the low-pressure-region and the opposing inner peripheral surface of the concave section 31 facing the head section bottom surface W in the low-pressure-region. Also, the springs 33 may be served by leaf springs 36.

Figure 17:
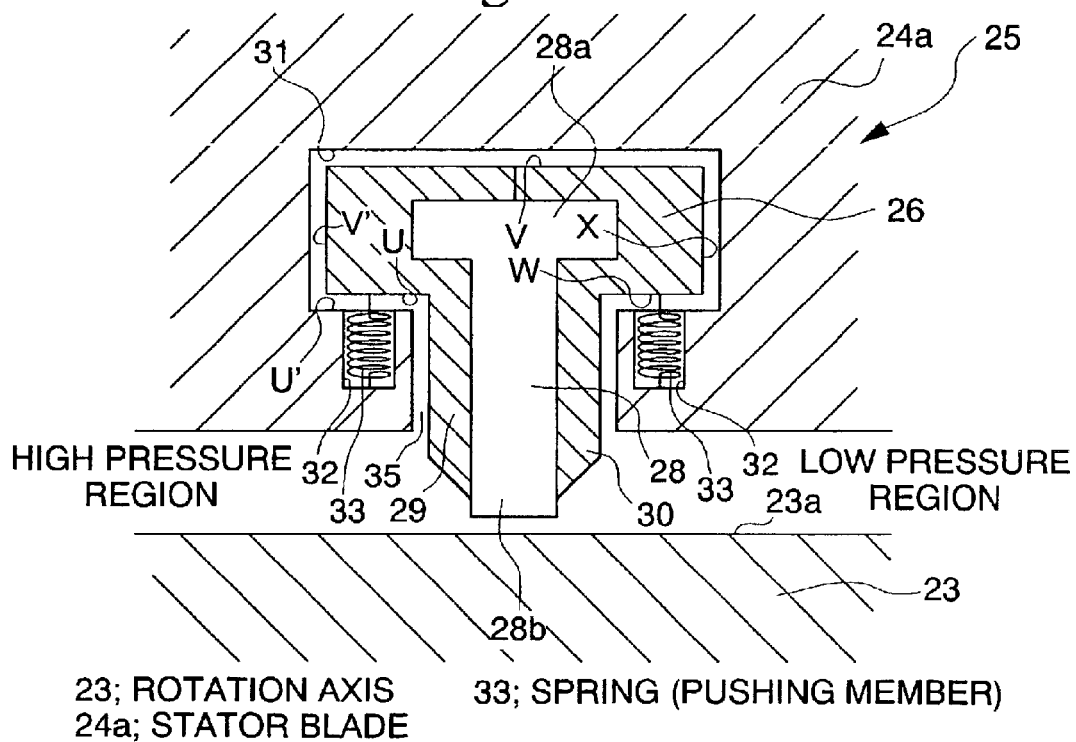
FIG. 17 is a cross section of a leaf seal viewed in a plane of the axis of the rotation shaft in a seventh embodiment.
Figure 18:
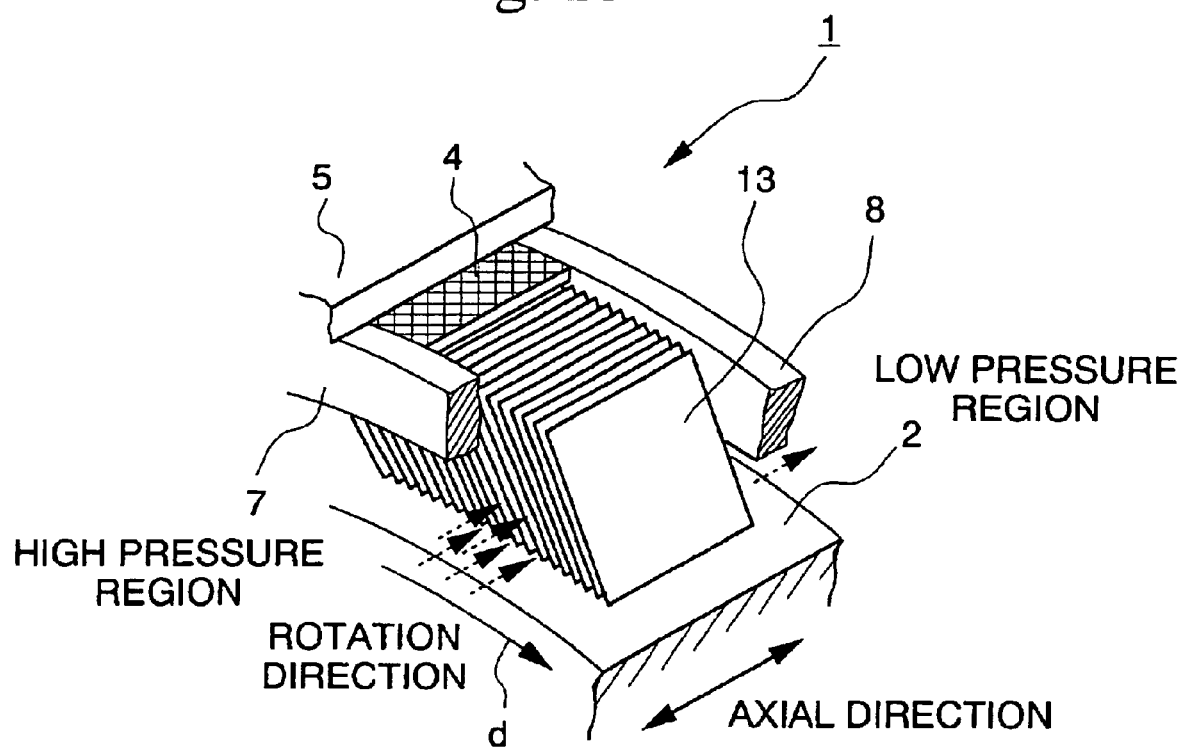
FIG. 18 is a diagram showing a conventional shaft seal structure.
Figure 19:
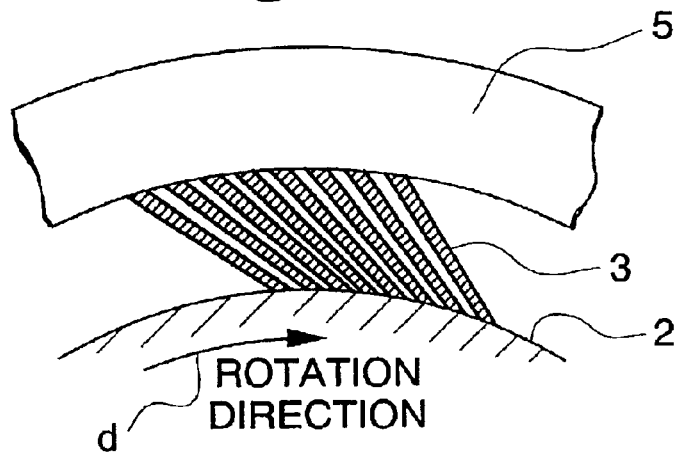
FIG. 19 is a cross section of the conventional seal structure in the direction of arrow I.
Figure 20:
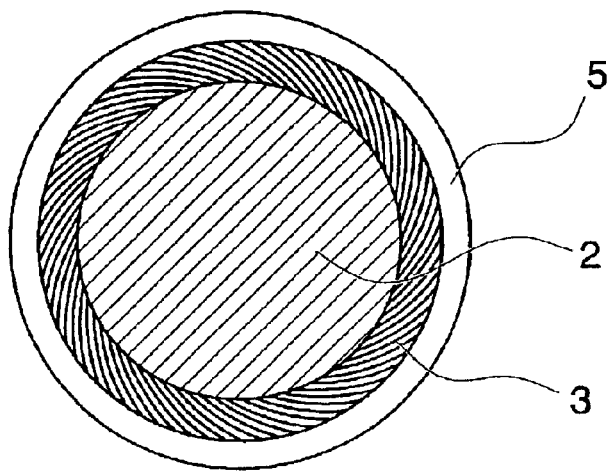
FIG. 20 is a cross section of the conventional shaft seal structure
Figure 21:
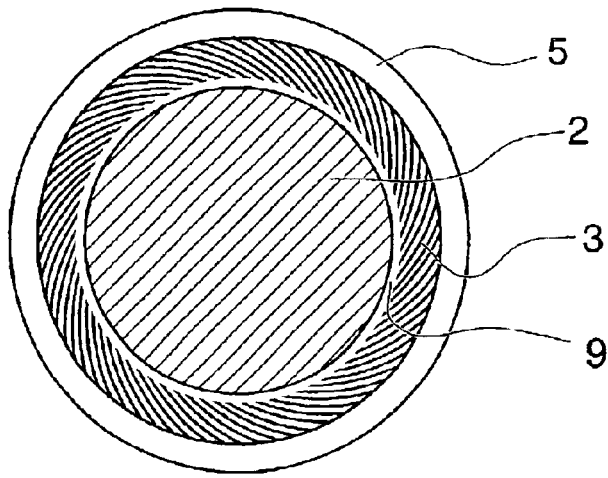
FIG. 21 is a cross section of the conventional shaft seal structure

Further, the location of the springs 33 across the boundary formed by the planar plates 28 is not limited to either the high-pressure-region or the low-pressure-region, such that, as shown in FIG. 17, they may be provided on both high-and low-pressure-regions.

According to the seventh embodiment of the leaf seal 25 having springs 33 provided on both the high-and low-pressure-regions, because the leaf seal ring 26 can be floated stably towards the outer peripheral side of the rotation shaft 23, during the lowspeed operation of the rotation shaft 23, it is possible to reliably prevent the tips 28 of the planar plate 28 to contact the peripheral surface 23a of the rotation shaft 23. Also, compared with the case of providing the springs only on one side of the planar plates 33, the load exerted by the leaf seal ring 26 on the springs 33 is reduced to a half so that degradation caused by the load on the springs 33 by the leaf seal ring 26 can be controlled.

It is certain that similar effects can be obtained when the springs 33 are replaced with leaf springs 36.

Here, in the leaf seal 25 in the sixth and seventh embodiments, the pushing member may be attached to the stator blade 24a side using the holding section 38. In such a case, similar to the case of leaf seal 25 in the third embodiment, it is not necessary to attach the pushing member directly to the inside of the stator blade 24a, so that the pushing member may be provided between the leaf seal ring 26 and the stator blade 24a, simply by attaching the holding section 38 having the pushing member. Also, if a pushing member is deteriorated or damaged, only the holding member 38 holding the relevant pushing member needs to be detached so that maintenance of pushing member can be performed efficiently.

Also, the pushing member may be provided on the leaf seal ring 26 side. In such a case, as similarly to the fourth and fifth embodiments, by attaching a leaf seal ring 26 having the pushing members in the concave sections 31 of the existing stator blade 24a that have no leaf springs 36, pushing members may be provided between the stator blade 24a and the leaf seal ring 26, without specially fabricating the concave section 31 of the stator blade 24a. Also, because the leaf springs 36 are provided on the leaf seal ring 26 side, thereby permitting simpler detachment compared with the case of attachment to the stator blade 24a, if a pushing member is deteriorated or damaged, work of maintaining the pushing member is facilitated.

Also, in each of the embodiments presented above, pushing members are not limited to springs 33 or leaf springs 36, so that the pushing members may be served by any means by which, when the differential sealing pressure is low, the leaf seal ring 26 is pushed towards the outer radial direction, and when the differential sealing pressure is high, the pushing force is absorbed by the pressure of the combustion gas guided into the space between the leaf seal ring 26 and the stator blade 24a.

What is claimed is:

1. A shaft seal structure for blocking a fluid to flow in an axial direction through a ring-shaped space formed between a rotation shaft and a stator section, comprising:

a leaf seal ring retained inside a groove in the stator section; and a plurality of planar plates separated from each other in a peripheral direction of the rotation shaft, said plurality of planar plates being partially contained in the groove in such a way that an outer peripheral end of each planar plate is fixed inside the leaf seal ring and a tip end of each planar plate, extending widthwise in the axial direction, makes a sliding contact with a peripheral surface of the rotation shaft at an acute angle;

pushing members disposed between the stator section and the leaf seal ring for forcing the leaf seal ring towards an outer radial direction to separate the leaf seal ring away from the rotation shaft; and pressure guiding grooves for guiding a fluid pressure from a high-pressure-region to a space between an outer peripheral surface of the leaf seal ring and an inner peripheral surface of the stator section through a boundary formed by the planar plates.

2. A shaft seal structure according to claim 1, wherein the pushing member is provided in a leaf seal ring side.

3. A shaft seal structure according to claim 1, wherein the pushing member is provided in a holding member that is separated from the stator section, and the holding member is provided in a stator section side.

4. A shaft seal structure according to one of claims 1 to 3, wherein the pushing member is provided in the high-pressure-region as well as in the low-pressure-region, with the planar plates intervening between two pressure regions.

5. A turbine having shaft seals according to one of claims 1 to 3, guiding a fluid at a high temperature and under a high pressure to a casing in such a way to blow the fluid at blades fixed to the rotation shaft rotatably supported inside the casing, so as to generate motion power by converting thermal energy of a fluid to rotational energy.

* * * * *